Feb. 23, 1965  L. N. WILLIAMS ETAL  3,170,967
METHOD OF MAKING VINYL FOAM SEALS
Filed March 25, 1960
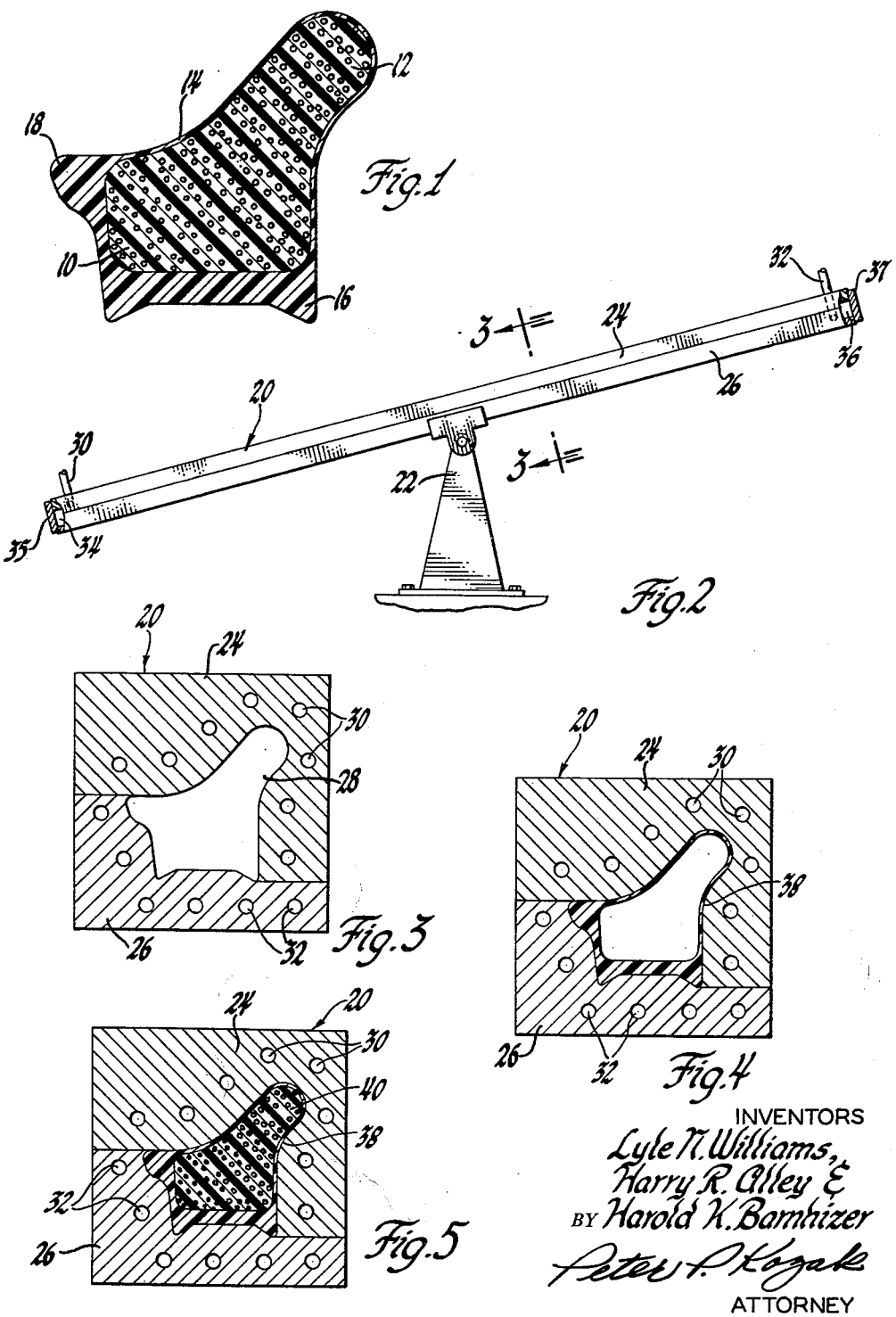
INVENTORS
Lyle N. Williams,
Harry R. Alley &
BY Harold K. Barnhizer
ATTORNEY

United States Patent Office 3,170,967
Patented Feb. 23, 1965

3,170,967
METHOD OF MAKING VINYL FOAM SEALS
Lyle N. Williams and Harry R. Alley, Anderson, and Harold K. Barnhizer, Lapel, Ind., assignors to General Motors Corporation, Detroit, Mich., a corporation of Delaware
Filed Mar. 25, 1960, Ser. No. 17,518
3 Claims. (Cl. 264—45)

This invention relates to foamed vinyl resin articles and more particularly to a method of manufacturing an elastic vinyl resin foam sealing strip useful for sealing automobile body doors and the like.

It is the basic object of this invention to provide an economical, efficient, abrasion-resistant sealing strip useful as weatherstripping on automobile doors or the like which consists of a vinyl resin foam having a moisture-impervious, adherent, flexible vinyl resin skin or coating. It is a further object of this invention to provide a method of molding a vinyl resin foam sealing strip whereby a vinyl foam main body portion is provided with a moisture-impervious, flexible and abrasion-resistant vinyl resin skin fused thereto. Another object of the invention is to provide a process by which a flexible, vinyl outer or skin layer of variable thickness is formed whereby the sealing strip may be provided with relatively heavy base and rigidifying portions. Yet another object of the invention is to provide a vinyl foam material having greatly improved compression set properties and a method of making such foam material in the form of a sealing strip.

These and other objects of the invention are accomplished by providing an elongated, two-part mold having an elongated cavity therein of the shape of the sealing strip to be made. The upper and lower portions of the mold are each provided with heating means whereby each mold half may be heated individually and selectively. In making a vinyl foam sealing strip in accordance with this invention, the mold members are assembled in a closed position and a vinyl plastisol is poured into the mold cavity so as to completely fill it. Meanwhile the mold halves are heated to the gelling temperature of the vinyl plastisol. The vinyl plastisol is permitted to remain in the mold cavity for a time sufficient to cause a vinyl plastisol layer of predetermined thickness to gel adjacent the mold cavity surfaces. The remaining liquid vinyl plastisol is removed from the mold preferably by applying a vacuum to one end thereof and a vinyl plastisol containing a suitable blowing agent capable of decomposing and releasing a gas at an elevated temperature below the fusion temperature of the vinyl plastisol is then deposited in the mold cavity adjacent the gelled layer of vinyl plastisol resin. The mold is then heated to at least the temperature at which the blowing agent decomposes. In this heating step the foamable vinyl material is caused to foam and completely fill the mold cavity. The mold is then heated to at least the fusion temperaturre of the plastisol. The vinyl foam plastisol material as well as the thin layer adjacent the mold cavity surfaces fuse together to form a vinyl foam sealing strip material having a relatively thin, impervious polyvinyl resin surface layer coextensively fused thereto. Next, the sealing strip material is cooled to approximately room temperature after which it is again heated to a temperature in the neighborhood of 175° F. to 200° F. for a period of at least four hours and preferably for about 15 hours. The heat aging step has the surprising result of reducing the compressive set of the foam material by over 50%. The resulting sealing strip is economical to manufacture, abrasion-resistant and impervious to the deleterious effects of moisture, dirt and like materials which automobile door weatherstripping is likely to come in contact with and efficient in use under widely varied weather conditions.

Other objects and advantages of this invention will more fully appear from the following description of a preferred embodiment of the invention described in connection with the accompanying drawing in which:

FIGURE 1 is a cross-sectional view of a sealing strip made in accordance with the present invention;

FIGURE 2 is an elongated mold pivotally mounted on a fulcrum;

FIGURE 3 is a cross-sectional view taken along line 3—3 of FIGURE 2;

FIGURE 4 is the mold section of FIGURE 3 after an impervious solid layer of a vinyl plastisol has been formed therein; and FIGURE 5 is the mold section of FIGURE 3 after the vinyl material has been foamed within the mold cavity.

The present invention is concerned primarily with the manufacture of a sealing strip made of a vinyl foam material and with a process for making a vinyl foam sealing strip material. In accordance with the invention, a sealing strip is provided which has a vinyl resin foam elastic inner structure which is encased in and coextensively fused to a relatively thin, flexible layer of a vinyl resin including a sealing lip portion. Preferably the sealing strip is provided with a relatively thick base section by which the strip may be fastened to a supporting member such as a car body and relatively thick side section for providing the sealing strip with a desired degree of rigidity on the side of the sealing strip opposite the sealing lip portion. The process includes steps whereby this seal structure is formed.

FIGURE 1 illustrates a cross-sectional view of a sealing strip of the present invention. It is to be understood that the seal illustrated in FIGURE 1 is of indefinite length. It has been found convenient to manufacture these sealing strips in lengths of about 14 feet. The sealing strip consists generally of a polyvinyl foam main body portion 10 which includes a sealing lip portion 12. The vinyl resin foam portion of the sealing strip is encased in a solid and impervious, relatively thin, polyvinyl resin layer or skin 14 which includes a relatively thick base portion 16 and a relatively thick side rib portion 18. As will be described hereinafter, the impervious vinyl resin skin 14 is fused to the foam body material 10 and 12 coextensively thereof.

The process of the present invention may be practiced as follows. An elongated mold 20 as shown in FIGURE 2 is preferably pivotally mounted on a support 22 generally in the manner of a teeter-totter. This mold may conveniently be about 14 feet long. As may be seen in FIGURE 3, the mold 20 includes an upper half 24 and a lower half 26 which define between them a mold cavity 28 having the configuration of the sealing strip shown in FIGURE 1 to be formed therein. The upper mold half 24 has provided therein longitudinal oil passages 30 and the lower mold half 26 has provided therein longitudinal passages 32 whereby a heated fluid such as an oil may be passed therethrough to apply heat to these mold sections independently. Of course, any suitable means, such as electrical heating elements and induction heating, may be employed to heat the mold sections. The mold 20 terminates at each end in the openings 34 and 36. Closure plates 35 and 37 are provided for closing the openings 34 and 36 respectively. It will be seen that the openings 34 and 36 may be caused to serve as downward or upward directed openings depending on the plane at which the mold 20 is permitted to rest.

In practicing the invention the mold 20 is tilted so that one opening 36 is raised above the opening 34 whereby the mold cavity 28 is inclined. A closure plate 35 is placed over the opening 34 and the cavity 28 is completely filled with a vinyl plastisol through the opening 36. Hot oil is then pumped through the conduits 32 of the lower half 26 of the mold. When the mold half 24 reaches a temperature of about 155° F. as measured by a thermocouple associated with the upper mold half 24, additional heat is applied to the upper mold half 24 by pumping the hot oil through the conduits 30. The heating is continued until the upper mold half 24 reaches a temperature of about 170° F. Circulation of the hot oil through the mold halves 24 and 26 is then stopped and cool oil is circulated through the molds until the upper mold half 24 attains a temperature of about 135° F. During these heating steps a layer 38 of the vinyl plastisol is formed adjacent the mold surfaces as shown in FIGURE 4. Since the lower mold half 26 had been heated for a longer period of time and to a higher temperature than the upper mold half 24, the vinyl layer build-up adjacent the lower mold half surfaces is proportionally greater. This differential heating step permits the relatively thick base portion 16 and side portion 18 of the sealing strip to be formed. In the time indicated above, the vinyl plastisol layer adjacent the mold half 24 is about 0.005 inch thick and the layer adjacent the lower mold half 26 is about 0.06 inch thick.

By the term "vinyl plastisol" as used herein is meant a dispersion of a vinyl resin such as polyvinyl chloride resin in a plasticizer together with stabilizers and the like. At elevated temperatures in the vicinity of 350° F., the polyvinyl chloride resin will dissolve in the plasticizer and fuse into a flexible thermoplastic resin. A suitable vinyl plastisol formulation for use in forming the skin portion 38 of the sealing strip is as follows:

| | Parts by weight |
|---|---|
| Polyvinyl chloride resin | 100 |
| Dioctyl adipate plasticizer | 35 |
| Monomeric epoxidized oil plasticizer | 35 |
| Dibasic lead phosphite stabilizer | 2 |

The composition of this vinyl plastisol may, of course, vary considerably in that other polyvinyl resin materials such as polyvinyl chloride-acetate copolymers and vinyl chloride-diethyl maleate copolymers may be used in place of the polyvinyl chloride. Various plasticizers such as tricresyl phosphate, di-2-ethylhexyl phthalate, dioctyl adipate, dioctyl sebecate and mixtures of these and other suitable plasticizers may be used. The proportion of plasticizer may vary between 60 and 100 parts by weight. The stabilizer may vary to from about 1 to 5 parts by weight. The particular vinyl plastisol to be used in the formation of the skin layer 38 is not critical except insofar as a vinyl plastisol of suitable viscosity is necessary to cause the plastisol to readily flow in and out of the mold cavity as is required in the process.

After the gelled vinyl plastisol layer 38 of desired thickness has been formed, the closure plate 35 is removed and a vacuum (not shown) is applied to the opening 34 for the purpose of rapidly and efficiently removing the ungelled vinyl plastisol material from the mold cavity. Next, the mold 20 is tilted so that the end 36 is in a lower position than the end 34. At this time, the temperature of the mold is about 130° F. which has been established for the purpose of forming the gelled vinyl plastisol layer 38. A metered quantity of a foamable or expandable vinyl plastisol is next injected into the lowered end 36. The quantity of expandable plastisol foam injected into the mold cavity and over the gelled layer 38 is sufficient to fully occupy the mold cavity space after it has expanded.

By the term "expandable vinyl plastisol" as used herein is meant a dispersion of a vinyl resin such as a finely divided polyvinyl chloride resin in a plasticizer into which has been incorporated a blowing agent such as N,N'-dinitroso-N,N'-dimethyl terephthalamide. A specific example of a suitable expandable vinyl plastisol is 100 parts of a plastisol grade polyvinyl chloride, 100 parts tricresyl phosphate, 5 parts dibasic lead phosphite and 3 parts N,N'-dinitroso-N,N'-dimethyl terephthalamide. As in the case of the nonexpandable vinyl plastisol described above, other polyvinyl resins may be employed such as the polyvinyl chloride-acetate copolymers and vinyl chloride-diethyl maleate copolymers. Similarly, other plasticizers such as tricresyl phosphate and di-2-ethylhexyl phthalate may be used. Stabilizers such as dibasic lead phosphite and the epoxy resin stabilizer Ferro 900, manufactured by the Ferro Corporation may be used. Based on 100 parts by weight of polyvinyl chloride resin, 80 to 105 parts of a suitable plasticizer may be used and 3 to 5 parts of a stabilizer may be included in the plastisol. 1 to 8 parts, preferably 2 to 4 parts, of N,N'-dinitroso-N,N'-dimethyl terephthalamide blowing agent may be incorporated in the vinyl plastisol.

After the metered quantity of the expandable vinyl plastisol has been injected into the mold cavity, the mold is heated to about 225° F. for the purpose of causing the blowing agent to decompose and release a gas capable of blowing or expanding the vinyl plastisol into a uniform cellular structure. The heating at the decomposition temperature of the blowing agent is continued until the foamed material comes out of the raised opposite end 34 of the mold. This insures that the vinyl plastisol has expanded to a suitable degree and has completely filled the mold cavity between the walls of the gelled vinyl plastisol layer 38 with the mass 40. The N,N'-dinitroso-N,N'-dimethyl terephthalamide blowing agent decomposes at about 175° F. and accordingly it is only necessary to heat the foamable plastisol to this temperature to cause a blowing or expansion of the vinyl plastisol material. However, it is found that best results are obtained by heating the mold to about 225° F. Blowing temperatures ranging from 180° F. to 250° F. produce satisfactory results.

The mold portions 24 and 26 are then heated to a temperature in the vicinity of 330° F. Meanwhile the foamed plastisol material has had an opportunity to contact and mingle with the gelled solid plastisol layer 38. As the mold members 24 and 26 are heated to 330° F., the vinyl plastisol foam material 40 as well as the solid layer 38 fuse and form a self-sustaining polyvinyl chloride resin material in a manner well known in the art. Further the layer 38 and foam mass 40 fuse together coextensively to form a continuous phase of the vinyl resin. Typically a satisfactory fusion of the vinyl plastisol foam 40 and the solid skin layer 38 is accomplished in about two minutes. Next, the mold is cooled and the sealing strip is removed and cooled to approximately room temperature. Thereafter the sealing strip is again heated to about 175° F. for a period of about 15 hours. This step produces a significantly greater resistance to set in the foam. The term "set" as used herein refers to the degree to which the foam material will fail to return to its original position after being subjected to compression. This treatment of heating the strip for about 15 hours at about 175° F. reduces the set of the sealing strip by over 50%. In the specific illustration described above, the set in the polyvinyl chloride resin foam is reduced from about 30% to about 10%. This reduction of the set of the polyvinyl chloride foam material is essential to its successful use for various sealing applications as, for example, the weatherstripping on an automobile door frame.

It is conventional in the art to fuse a vinyl plastisol at a temperature in the vicinity of 350° F. It has been found that the step of heating the vinyl plastisol for about 15 hours at 175° F. is effective in reducing the compression set of the vinyl plastisol only if the vinyl plastisol material has been fused at a temperature between about 325° F. and 335° F. and preferably 330° F. It has been found that significant reduction in set may be obtained when the heating temperature is varied from 175° F. to 200° F. and the heat aging time is at least about four hours. Heat aging time in excess of 15 hours does not appear to produce any additional beneficial results.

The vinyl plastisol sealing strip formed in accordance with the method set forth above provides an outer layer which is fused to the inner foamed main body and provides the seal stripping with abrasion resistance as well as a water seal. Fusing the vinyl plastisol material at the lower temperature of 330° F. has the additional benefical effect of forming relatively fine and uniform cellular structure particularly desirable in sealing strip material for use in connection with automobile doors.

While the embodiment of the present invention as herein described constitutes a preferred form, it is to be understood that other forms may be adopted within the spirit of the invention.

We claim:

1. A method of making a polyvinyl foam sealing strip comprising the steps of filling a mold cavity having a configuration of said sealing strip to be formed with a vinyl plastisol capable of forming on fusion a flexible solid non-porous material, applying sufficient heat to said mold to cause said plastisol to form a gelled layer of predetermined thickness adjacent the mold cavity surfaces, withdrawing the ungelled vinyl plastisol from said mold cavity, depositing a quantity of a foamable vinyl plastisol into said mold cavity, said quantity being sufficient on expanding to completely fill the mold cavity, applying aditional heat to said mold at a temperature capable of causing said foamable plastisol to expand and completely fill the mold cavity, heating the mold to between about 325° F. and 335° F. whereby said foamed material is fused with said layer to form a flexible, self-sustaining strip, cooling the formed sealing strip to approximately room temperature and finally subjecting said sealing strip to a heat aging treatment of at least four hours at a temperature in the range of 175° F. to 200° F.

2. A method of forming a vinyl foam sealing strip comprising the steps of filling an elongated mold cavity having the configuration of the sealing strip to be formed with a polyvinyl chloride plastisol, heating said plastisol to its gelling temperature for a time sufficient to cause the formation of a gelled plastisol layer of predetermined thickness adjacent the mold cavity surfaces, withdrawing the unjelled plastisol from said cavity depositing a predetermined quantity of a foamable polyvinyl chloride plastisol material including N,N'-dinitroso-N,N'-dimethyl terephthalamide in the mold cavity, heating the mold to a temperature in the range of about 180° F. to 250° F. for a time sufficient to cause said expandable plastisol to expand and completely fill the mold cavity, heating the expanded plastisol to a temperature in the range of 325° F. to 335° F. for a time sufficient to cause fusion of said plastisol, cooling the formed sealing strip to approximately room temperature and finally heating said sealing strip to a temperature in the range of 175° F. to 200° F. for a time of at least four hours.

3. A method of forming a vinyl foam sealing strip comprising the steps of filling an elongated mold cavity having the configuration of the sealing strip to be formed with a polyvinyl chloride plastisol, heating said plastisol to the gelling temperature of the vinyl plastisol for a time sufficient to cause the formation of a gelled plastisol layer of predetermined thickness adjacent the mold cavity surfaces, withdrawing the unjelled plastisol from said cavity depositing a foamable plastisol material containing N,N'-dinitroso-N,N'-dimethyl terephthalamide in the mold cavity, heating the mold to a temperature on the order of about 225° F. for a time sufficient to cause said expandable plastisol to expand and completely fill the mold cavity, heating said mold to a temperature on the order of 330° F. for a time sufficient to cause fusion of said plastisols, cooling the formed sealing strip to approximately room temperature and finally subjecting said sealing strip to further heating at a temperature in the range of 175° F. to 200° F. for a time of at least 15 hours.

References Cited in the file of this patent

UNITED STATES PATENTS

| | | |
|---|---|---|
| 2,950,505 | Frank | Aug. 30, 1900 |
| 2,231,769 | Merrill | Feb. 11, 1941 |
| 2,308,971 | Carter | Jan. 19, 1943 |
| 2,394,327 | Niessen et al. | Feb. 5, 1946 |
| 2,525,966 | Smith et al. | Oct. 17, 1950 |
| 2,588,571 | Porter | Mar. 11, 1952 |
| 2,638,642 | Spraragen | May 19, 1953 |
| 2,719,830 | Flood et al. | Oct. 4, 1955 |
| 2,752,642 | Sullivan | July 10, 1956 |
| 2,772,194 | Fisher et al. | Nov. 27, 1956 |
| 2,830,325 | Bray | Apr. 15, 1958 |
| 2,884,668 | Harris et al. | May 5, 1959 |
| 2,898,634 | Alderfer | Aug. 11, 1959 |
| 2,959,820 | Miller et al. | Nov. 15, 1960 |
| 2,974,373 | Streed et al. | Mar. 14, 1961 |
| 2,995,778 | Hill | Aug. 15, 1961 |
| 3,002,230 | Stewart | Oct. 3, 1961 |
| 3,011,218 | Mitten | Dec. 5, 1961 |
| 3,032,828 | Bethe et al. | May 8, 1962 |
| 3,016,576 | Downing et al. | Jan. 16, 1962 |

FOREIGN PATENTS

| | | |
|---|---|---|
| 563,042 | Canada | Sept. 9, 1958 |

OTHER REFERENCES

Plastics Engineering Handbook, 3rd Ed., Reinhold Pub. Corp., 1960, page 192.